US008804048B2

(12) United States Patent
Ye et al.

(10) Patent No.: US 8,804,048 B2
(45) Date of Patent: Aug. 12, 2014

(54) MOTION-ADAPTIVE ALTERNATE GAMMA DRIVE FOR LCD

(75) Inventors: Bo Ye, Cupertino, CA (US); Taesung Kim, Los Altos, CA (US); Chung Phan Vu, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 1058 days.

(21) Appl. No.: 12/254,289

(22) Filed: Oct. 20, 2008

(65) Prior Publication Data

US 2009/0109290 A1 Apr. 30, 2009

Related U.S. Application Data

(60) Provisional application No. 60/982,580, filed on Oct. 25, 2007, provisional application No. 60/986,462, filed on Nov. 8, 2007, provisional application No. 60/987,228, filed on Nov. 12, 2007, provisional application No. 60/991,479, filed on Nov. 30, 2007.

(51) Int. Cl.
*H04N 7/18* (2006.01)

(52) U.S. Cl.
USPC .......... 348/701

(58) Field of Classification Search
USPC .......... 348/155
See application file for complete search history.

(56) References Cited

U.S. PATENT DOCUMENTS 6,288,745 B1 * 9/2001 Okuno et al. .......... 348/448
8,154,628 B2 * 4/2012 Ishida et al. .......... 348/241
2002/0136448 A1 * 9/2002 Bortolussi et al. .......... 382/164
2003/0210256 A1 * 11/2003 Mori et al. .......... 345/690
2007/0035502 A1 * 2/2007 Kawaguchi .......... 345/98
2007/0063944 A1 * 3/2007 Sato et al. .......... 345/87
2007/0103418 A1 5/2007 Ogino (Continued)

FOREIGN PATENT DOCUMENTS

CN 1975851 6/2007
EP 1536407 A 6/2005

(Continued)

OTHER PUBLICATIONS

Kimura, N. et al, "60.2: Invited Paper: New Technologies for Large-Sized High-Quality LCD TV", 2005 SID International Symposium, May 24, 2005, pp. 1734-1737, vol. XXXVI, SID International Symposium.

(Continued)

*Primary Examiner* — Tung Vo
*Assistant Examiner* — Obafemi Sosanya

(57) ABSTRACT

Systems and methods are provided for reducing motion blur in a video display. A system for reducing motion blur in a video display may include a motion detection circuit and a luminance control circuit. The motion detection circuit may be used to compare a plurality of frames in a video signal to generate a motion detection output signal that indicates whether the video signal includes an image that is in motion or a still image. The luminance control circuit may be used to vary luminance levels between two or more consecutive frames of the video signal when the motion detection output signal indicates that the video signal includes an image that is in motion. The luminance control circuit further may also be used to discontinue varying the luminance levels of the video signal when the motion detection output signal indicates that the video signal includes a still image.

38 Claims, 11 Drawing Sheets

(56) References Cited

U.S. PATENT DOCUMENTS

| | | | | |
|---|---|---|---|---|
| 2007/0159530 | A1* | 7/2007 | Park | 348/143 |
| 2007/0171217 | A1* | 7/2007 | Tsai et al. | 345/207 |
| 2007/0216616 | A1* | 9/2007 | Stessen et al. | 345/84 |
| 2007/0262937 | A1* | 11/2007 | Take et al. | 345/87 |
| 2008/0123987 | A1* | 5/2008 | Shen et al. | 382/255 |

FOREIGN PATENT DOCUMENTS

| | | | |
|---|---|---|---|
| TW | 518555 | | 1/2003 |
| WO | 2006/121188 | A | 11/2006 |
| WO | 2007/040045 | A | 4/2007 |

OTHER PUBLICATIONS

European Patent Office, Invitation to Pay Additional Fees and Communication Relating to the Results of the Partial International Search, PCT/US2008/080459 issued Feb. 19, 2009.

Notification/Text of First Office Action issued in China dated Feb. 20, 2013 for related/corresponding Application No. 200880117197.X.

Notification of 2nd Office Action issued on Sep. 5, 2013 in related/corresponding Chinese Patent Application No. 200880117197.X.

First Office Action dated Feb. 8, 2014 from related/corresponding Taiwanese Patent Appl. No. 097140735.

Third Office Action dated Jan. 2, 2014 from related/corresponding Chinese Patent Appl. No. 200880117197.X.

* cited by examiner

MOTION-ADAPTIVE ALTERNATE GAMMA DRIVE FOR LCD

CROSS-REFERENCE TO RELATED APPLICATIONS

This application claims priority from the following prior applications, each of which are incorporated herein by reference in their entirety: U.S. Provisional Application No. 60/982,580, filed on Oct. 25, 2007 and titled "Motion-Adaptive Alternate Gamma Drive for LCD;" U.S. Provisional Application No. 60/986,462, filed Nov. 8, 2007 and titled "Motion Detection in Digital Display;" U.S. Provisional Application No. 60/987,228, filed Nov. 12, 2007 and titled "Motion-Adaptive Alternating Gamma Drive for Flicker-Free Impulsive Driving Technique;" and U.S. Provisional Application No. 60/991,479, filed Nov. 30, 2007 and titled "Motion-Adaptive Alternating Gamma Drive for Flicker-Free Motion-Blur Reduction in 100/120 Hz LCD-TV."

FIELD

The technology described in this patent document relates generally to video processing. More particularly, a motion-adaptive alternating gamma drive for a video display is provided that is especially useful for reducing motion blur in a liquid crystal display (LCD).

BACKGROUND

Motion blur is a well-known problem associated with LCDs. Several technologies are commonly used to correct for LCD motion blur, including motion-compensated frame rate conversion (MC-FRC) and impulsive driving techniques. MC-FRC is a complex, high-cost approach that may not be suitable for many applications. Impulsive driving techniques provide lower-cost solutions, but often result in a lower quality image due to large area flicker and luminance loss. For example, in known impulsive driving techniques referred to as black frame insertion (BFI) and grey frame insertion (GFI), the frame rate of the video signal is doubled (e.g., to 120 Hz) and every other frame is replaced with a black or grey frame to better mimic the impulse response of the image and reduce motion blur. However, inserting black or grey frames may cause an undesirable reduction in the overall luminance of the display or a reduction in the color saturation of the image. It is therefore desirable to provide a low-cost impulsive driving technique that removes LCD motion blur and preserves the original luminance level of the image.

SUMMARY

In accordance with the teachings described herein, systems and methods are provided for reducing motion blur in a video display. A system for reducing motion blur in a video display may include a motion detection circuit and a luminance control circuit. The motion detection circuit may be used to compare a plurality of frames in a video signal to generate a motion detection output signal that indicates whether the video signal includes an image that is in motion or a still image. The luminance control circuit may be used to vary luminance levels between two or more consecutive frames of the video signal when the motion detection output signal indicates that the video signal includes an image that is in motion. The luminance control circuit further may also be used to discontinue varying the luminance levels of the video signal when the motion detection output signal indicates that the video signal includes a still image.

A system for reducing motion blur in a video display may also include a frame-doubling data sampler that is configured to double the frames of the video signal such that each frame of the video signal is split into a first frame and a second frame. In one example, the luminance levels may be varied between the two or more consecutive frames by increasing the luminance level of the first frame and decreasing the luminance level of the second frame. In other examples, the luminance levels may be varied between the two or more consecutive frames by replacing each second frame with a black frame or grey frames. In addition, the system may utilize a bright and dark look-up tables, where the bright and dark look-up tables each include sets of luminance correction values that are selected such that the average of the luminance values in the bright and dark look-up tables preserves the original luminance of the video signal.

In another example embodiment, the amount by which the luminance level is varied between the two or more consecutive frames may be gradually increased when the motion detection output signal indicates that the video signal includes an image that is in motion and gradually decreased when the motion detection output signal indicates that the video signal includes a still image. In this example, a gain control block may be used to apply a gain coefficient to luminance values from the first and second sets of luminance values to adjust the luminance levels of the first and second frames. The gain control block may be further configured to vary the gain coefficient to cause the gradual increase or gradual decrease in the amount by which the luminance levels are varied between the two or more consecutive frames.

An example motion detection circuit may include a frame comparison block and a motion threshold comparison block. The frame comparison block may be used to determine a number of pixel changes between consecutive frames in the video signal. The motion threshold comparison block may be used to compare the number of pixel changes with a global motion threshold value, wherein a number of pixel changes greater than the global motion threshold value is an indication that the video signal includes an image that is in motion. The frame comparison block may also be configured to apply a sensitivity setting to identify pixel changes between consecutive frames such that pixel variations below the sensitivity setting are ignored.

In one example, the motion threshold comparison block may be further used to generate a binary output that indicates whether or not the number of pixel changes is greater than the global motion threshold. In this example, the motion detection circuit may also include a shift register and a pattern comparison block. The shift register may be used to store the binary output for a plurality of consecutive frames of the video signal. The pattern comparison block may be used to compare the stored binary output with a first bit pattern that is indicative of motion and generate the motion detection output signal to indicate that the video signal includes an image that is in motion when the stored binary output matches the first bit pattern. In addition, the pattern comparison block may also be used to compare the stored binary output with a second bit pattern that is indicative of stillness and generate the motion detection output to indicate that the video includes a still image when the stored binary output matches the second bit pattern. In one example, the first bit pattern may include a plurality of multiple bit windows, and the pattern comparison block may be configured to identify a match between the stored binary output and the first bit pattern if the stored binary output includes at least one bit indicative of motion in each of the plurality of multiple bit windows.

DETAILED DESCRIPTION

Figure 1A:
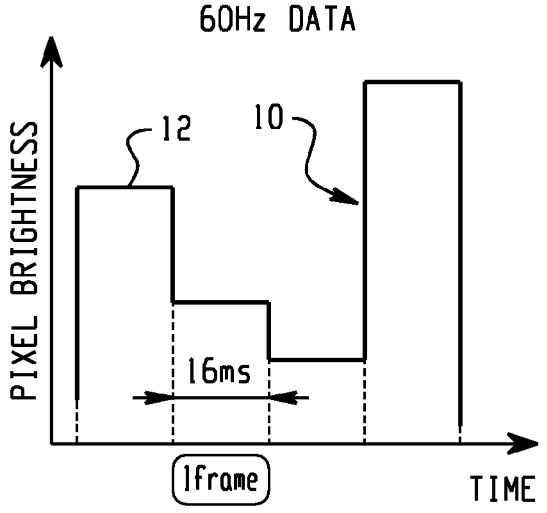
FIGS. 1A-1C are diagrams depicting an alternating gamma drive (AGD) technique for reducing motion blur in an LCD.
Figure 1B:
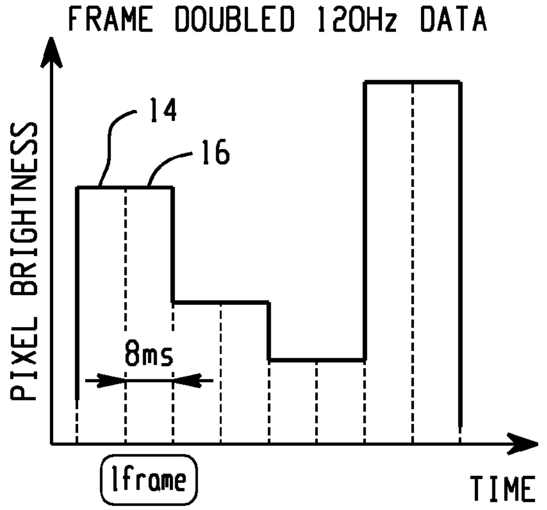
Figure 1C:
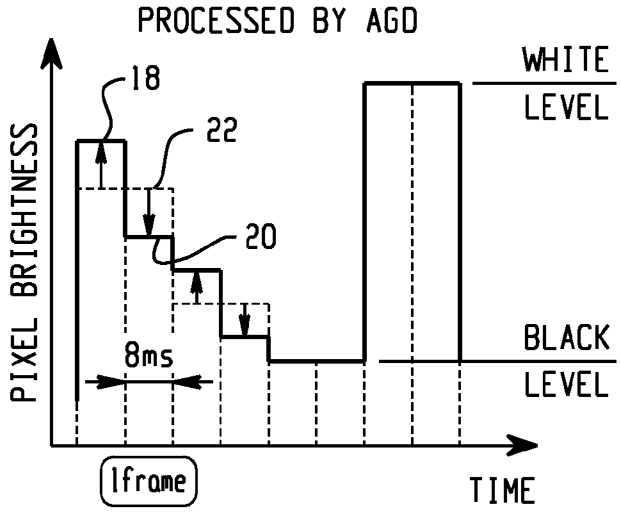

FIGS. 1A-1C illustrate an impulsive driving technique, referred to as alternating gamma drive (AGD), that may be used to reduce motion blur in an LCD. FIG. 1A shows an example 60 Hz video signal 10 for display on an LCD. As shown, LCDs are hold-type displays in which the same pixel brightness is maintained for the entire duration of the frame. In order to compensate for motion blur in the image, the video signal 10 is first sampled at twice the frame rate (120 Hz), as shown in FIG. 1B. The pixel luminance is then varied in successive frames to provide an impulsive effect, as shown in FIG. 1C. In this example, the luminance is adjusted to achieve an impulsive effect in each set of frames that are not at the maximum (white) or minimum (black) brightness levels.

With reference to FIG. 1C, the illustrated AGD technique implements an impulsive effect in the image by increasing and decreasing the brightness of successive frames such that the average luminance of adjacent frames preserves the original luminance of the image. As an example, consider the first 60 Hz frame 12 that is received in FIG. 1A and converted into two identical 120 Hz frames 14, 16 in FIG. 1B. An impulsive effect is achieved by increasing the luminance of the first 120 Hz frame 18 and decreasing the luminance of the second 120 Hz frame 20, as shown in FIG. 1C. As illustrated, the average luminance 22 of the first and second gamma-adjusted 120 Hz frames 18, 20 is the same as the luminance of the 60 Hz frame 12. As a result, the human eye cannot perceive a difference between the original luminance of the 60 Hz frame 12 and the luminance in the first two gamma-adjusted 120 Hz frames 18, 20.

Figure 2A:
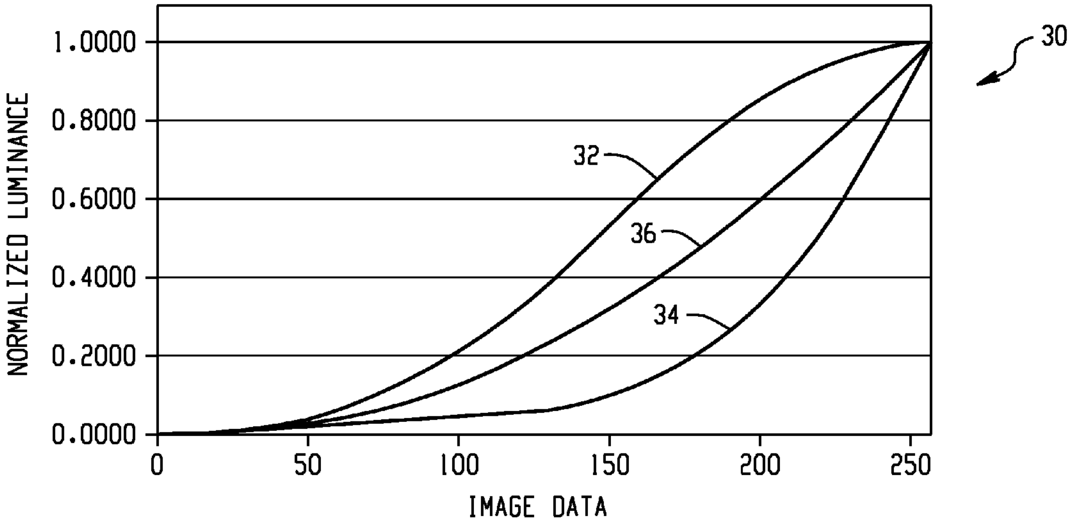
FIG. 2A is a graph depicting example bright and dark gamma curves for AGD.

FIG. 2A is a graph 30 depicting example bright and dark gamma curves 32, 34 for implementing AGD. The middle gamma curve 36 represents the target gamma for the LCD. The bright and dark gamma curves 32, 34 applied by the AGD technique are defined such that their average luminance corresponds to the target gamma 36. The bright and dark gamma curves 32, 34 may be achieved using look-up tables, as shown in FIG. 2B.

Figure 2B:
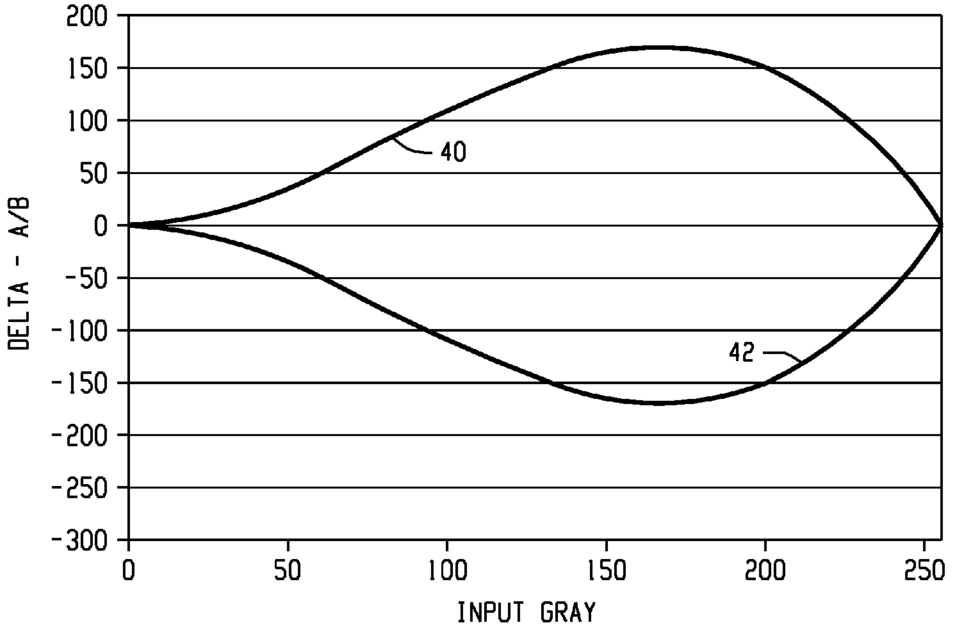
FIG. 2B is a graph depicting example look-up table (LUT) values for implementing the gamma curves.

FIG. 2B depicts example bright and dark look-up table values 40, 42 that may be used to determine the amount by which the luminance of consecutive frames is increased or decreased during the AGD process. As shown in FIG. 2B, for each luminance value (0-255) of the input data, the look-up tables provide a light 40 and dark 42 delta value for adjusting the luminance to achieve an impulsive effect while maintaining the desired average gamma 36. For instance, with reference to FIGS. 1A-1C, the light look-up table 40 may be used to determine the increase in luminance applied to the first gamma-corrected frame 18 based on the luminance value 22 of the original input data 12. Similarly, the dark look-up table 42 may be used to determine the decrease in luminance applied to the second gamma-corrected frame 20.

The AGD technique illustrated in FIGS. 1A-2B reduces LCD motion blur while maintaining the original luminance of the image. However, screen flicker may still pose a problem when displaying static images, particularly for image regions with mid-gray levels. This is because of a very large luminance change between frames. In addition, it is typically very difficult to precisely characterize the LCD panel gamma factor when applying impulsive driving techniques to a static image. When AGD is used for static images, the image quality may be further degraded by quantization error of response time compensation (RTC) which typically uses interpolation technique for simple hardware. The quantization error in RTC calculation has nothing to do with image quality in case of conventional driving because RTC is applied only when images are in motion. Providing a higher accuracy RTC calculation typically leads to higher implementation costs. It has therefore been determined that a low-cost and high performance solution may be provided by utilizing a motion-adaptive AGD technique that selectively applies impulsive driving only for moving images.

Figure 3:
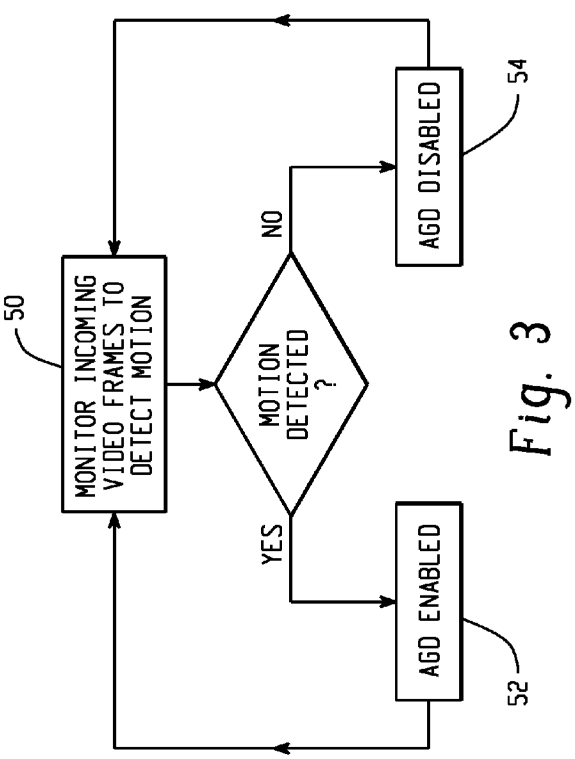
FIG. 3 is a flow diagram depicting an example motion-adaptive AGD method for reducing motion blur in an LCD.

FIG. 3 is a flow diagram depicting an example motion-adaptive AGD method. In step 50, incoming video frames are monitored to detect global motion. If motion is detected, then AGD is enabled in step 52 to reduce motion blur (referred to herein as AGD-ON mode). Otherwise, during periods when no motion is detected, AGD is disabled in step 54 to prevent screen flicker caused by applying AGD to still images (referred to herein as AGD-OFF mode).

Figure 4:
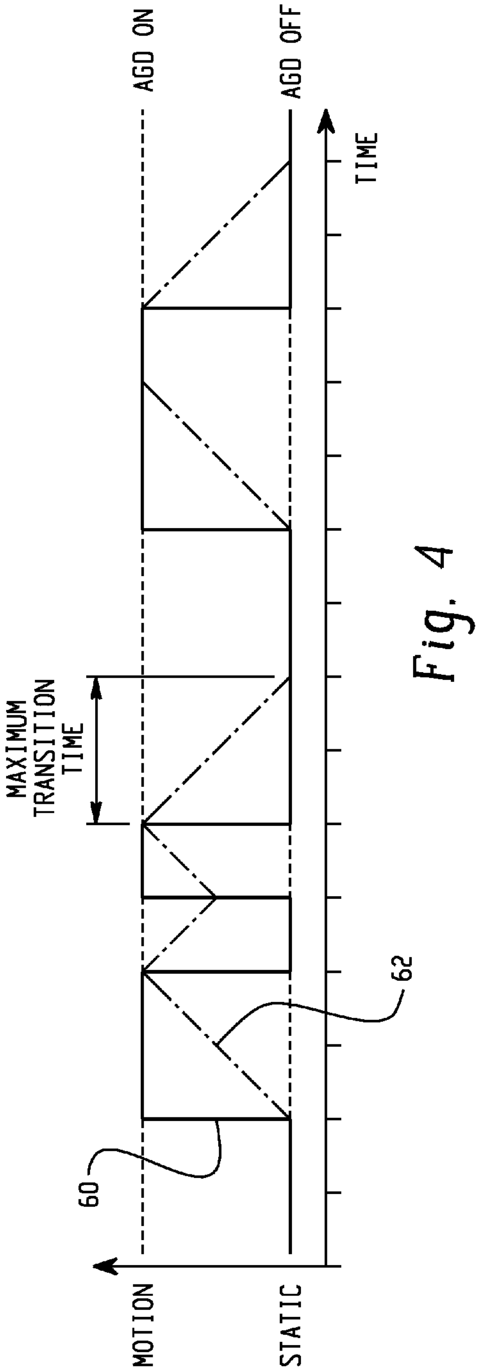
FIG. 4 is a diagram depicting an example method for transitioning between AGD-ON and AGD-OFF modes.

In the motion-adaptive AGD method depicted in FIG. 3, a large-area flicker effect could be caused if there is an abrupt change in luminance during a transition between AGD-ON and AGD-OFF modes. Accordingly, the AGD strength may be gradually transitioned during the mode switching phase, as illustrated in the example shown in FIG. 4. The example depicted in FIG. 4 includes a first plot 60 that indicates periods during which motion is detected in an incoming video signal and a second plot 62 that shows the corresponding change in AGD strength. As shown, the AGD strength gradually rises or falls following a transition between AGD-ON and AGD-OFF modes. The minimum AGD strength shown in FIG. 4 corresponds to a gamma curve change of zero and the maximum AGD strength corresponds to the full amount of gamma curve modification. This is further illustrated with reference to the gamma correction curves shown in FIGS. 5A and 5B.

Figure 5A:
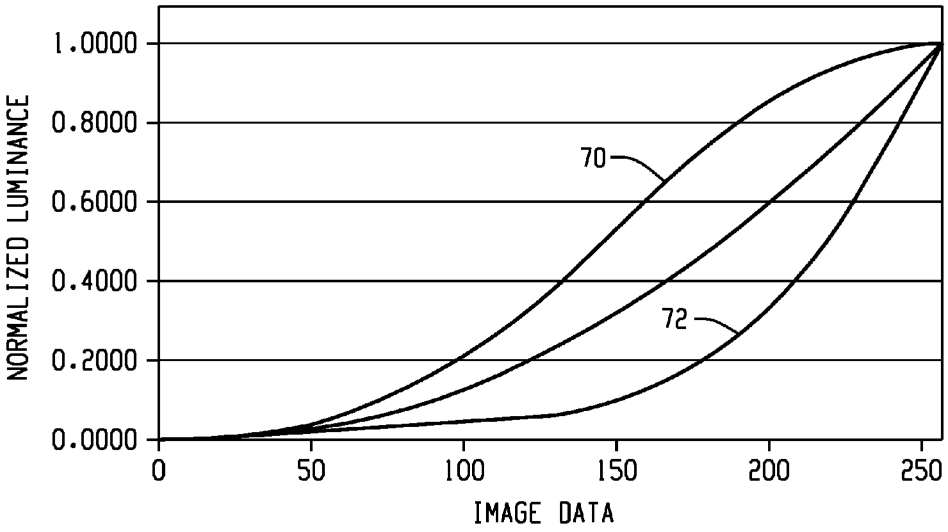
FIG. 5A is graph depicting example bright and dark gamma curves for AGD.
Figure 5B:
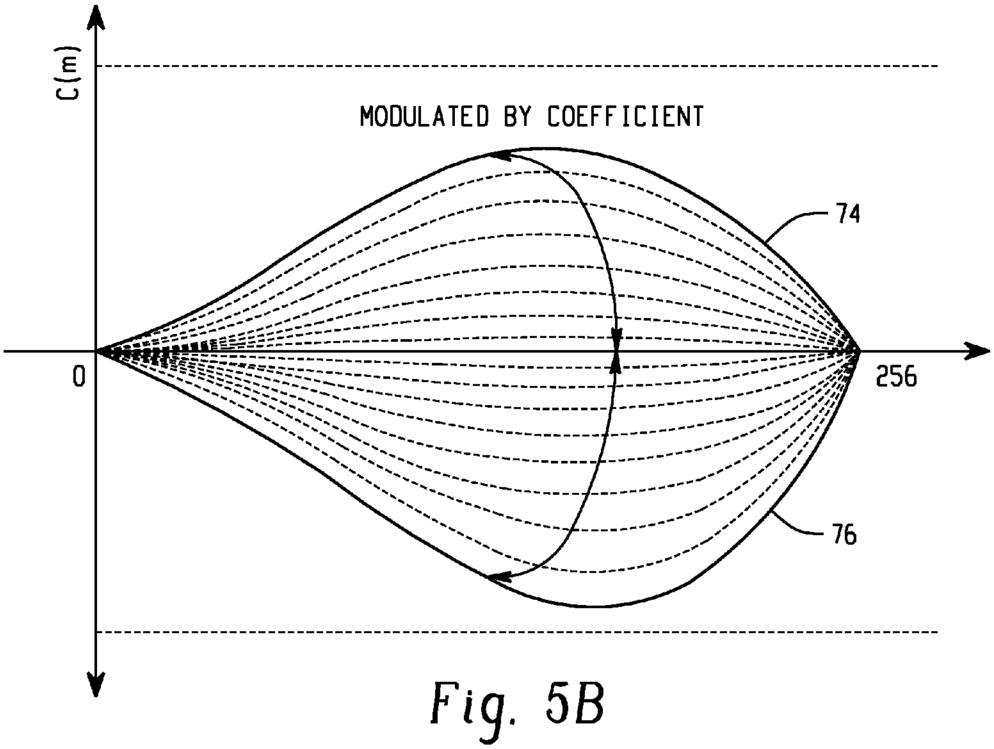
FIG. 5B is a graph that shows an example of how bright and dark LUT values may be modulated by coefficients to implement motion-adaptive AGD.

FIG. 5A depicts example bright and dark gamma curves 70, 72 for implementing AGD, and FIG. 5B depicts bright and dark look-up table values 74, 76 for adjusting the luminance of consecutive frames to achieve the desired AGD gamma curves 70, 72. The top-most and bottom-most curves in FIG. 5B are the bright and dark look-up table values that are used at full AGD strength. The dotted curves depicted in FIG. 5B show the bright and dark luminance correction applied during the transitional periods shown in FIG. 4 to achieve a gradual increase or reduction in AGD strength. These transitional luminance correction values may, for example, be determined by applying a gain coefficient, C(m), to the bright and dark look-up table values 74, 76.

To determine the gain coefficient, C(m), for gradually increasing or decreasing the AGD strength, the AGD strength can be defined as the data swing amplitude between the bright-adjusted luminance and the dark-adjusted luminance, as follows:

$$\text{AGD strength}=|\Delta^{+}+\Delta^{-}|,$$

where $\Delta^{+}$ is the increase in luminance from the input value and $\Delta^{-}$ is the decrease in luminance from the input value. The AGD process can then be represented as follows:

$$D_{out,n}=D_{in,n}+(-1)^{n}\cdot\Delta(d)$$

where $\Delta(d)=\Delta^{+}$, n=0, 2, 4, . . .

$\Delta^{-}$, n=1, 3, 5, . . .

where n is frame number, d is the data value, and Δ is the gain value. To achieve a smooth transition scheme, the gain coefficient, C(m), may be introduced in accordance with the following equation:

$$D_{out,n}=D_{in,n}+(-1)^{n}\cdot C(m)\cdot\Delta(d)$$

where $\Delta(d)=\Delta^{+}$, n=0, 2, 4, . . .

$\Delta^{-}$, n=1, 3, 5, . . .

The gain coefficient, C(m), as defined by the above equation, varies from 0 to 1 during the AGD transition period, where full-strength AGD results when C(m)=1. A smooth transition is achieved by increasing C(m) in steps when motion is detected and decreasing C(m) in steps when motion stops. In this manner, the step size for increasing and decreasing C(m), along with the duration of the transition period, may be defined such that the human eye cannot perceive any luminance change.

Figure 6:
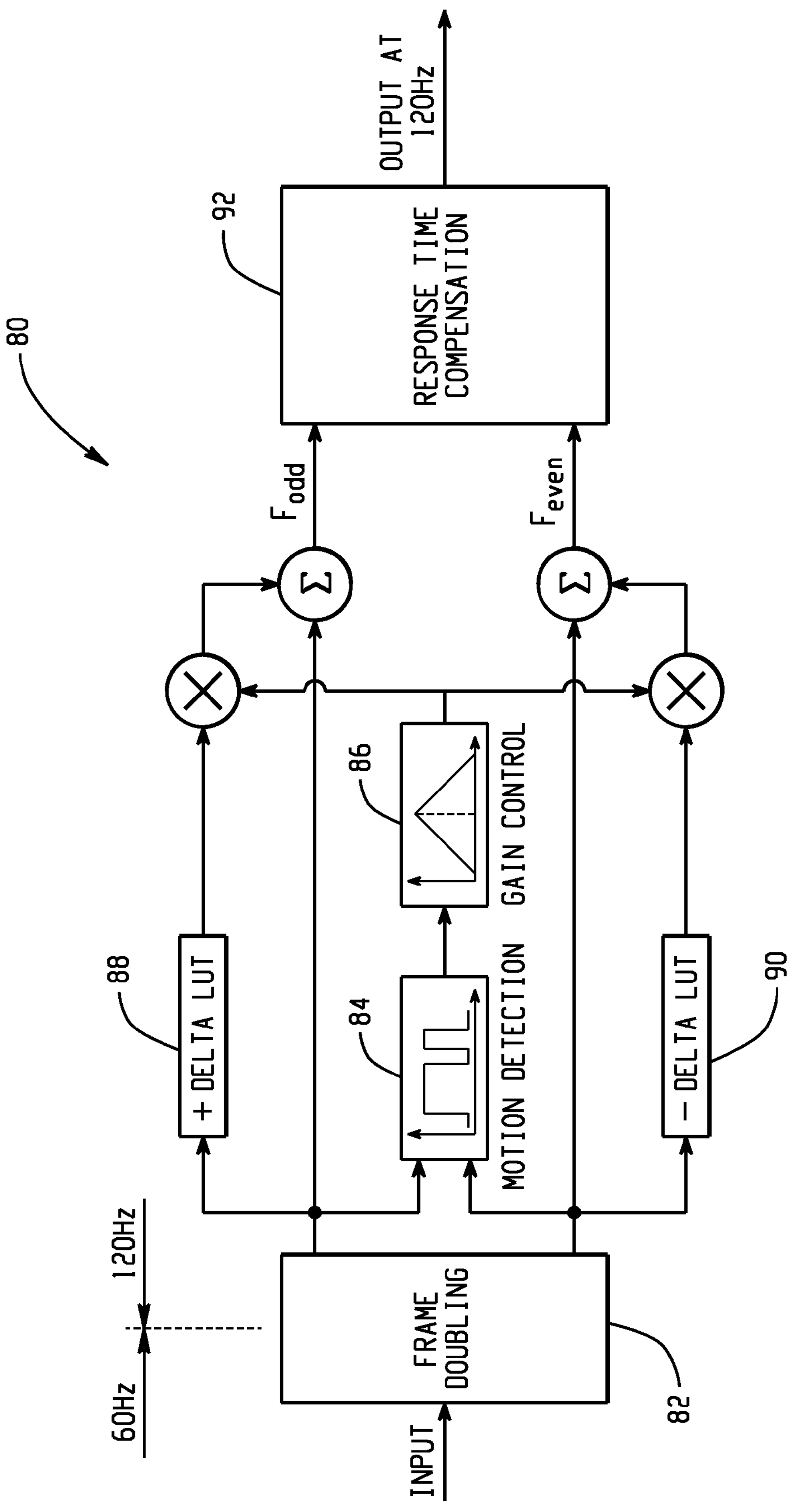
FIG. 6 is a block diagram of an example motion-adaptive AGD system.

FIG. 6 is a block diagram of an example motion-adaptive AGD system 80. The system 80 includes a frame-doubling data sampler 82, a motion detection block 84, a gain control block 86, and bright (+Delta) and dark (−Delta) lookup tables 88, 90. Also illustrated is a response time compensation (RTC) block 92. It should be understood that the system blocks shown in FIG. 6, as well as the system blocks set forth in the other system diagrams described herein, may be implemented using software, hardware or a combination of software and hardware components. In addition, hardware components for one or more of the system blocks may be implemented in a single integrated circuit or using multiple circuit components.

In operation, the frame-doubling data sampler 82 receives an input video signal and re-samples the input at double speed (e.g., 120 Hz). The odd and even frames from the re-sampled video signal are then processed through two different data paths to implement motion-adaptive AGD. Specifically, the motion detection block 84 monitors the incoming odd and even frames to detect motion in the received image. For example, the motion detection block 84 may identify motion in the image by detecting changes in the pixel values between successive frames in the video input as a simplest implementation example. The motion detection block 84 generates a motion detection output to the gain control block 86 that indicates whether motion has been detected in the video input or whether the video image is still. In response to the motion detection output, the gain control block 86 generates a gain coefficient, for example as described above with reference to FIGS. 4-5B.

The bright and dark look-up tables 88, 90 are used to output luminance correction values ($\Delta^{+}$ and $\Delta^{-}$) as a function of the luminance level of the re-sampled video signal. The luminance correction values ($\Delta^{+}$ and $\Delta^{-}$) are multiplied by the gain coefficient and are then respectively applied to the odd and even frames of the re-sampled video signal to generate odd and even gamma-adjusted outputs ($F_{odd}$ and $F_{even}$). The gamma-adjusted outputs ($F_{odd}$ and $F_{even}$) are received by the RTC block 92, which accelerates the temporal response time of the liquid crystal molecules of the LCD so that the luminance transition produced by the motion-adaptive AGD system 80 can occur within a single frame.

Figure 7:
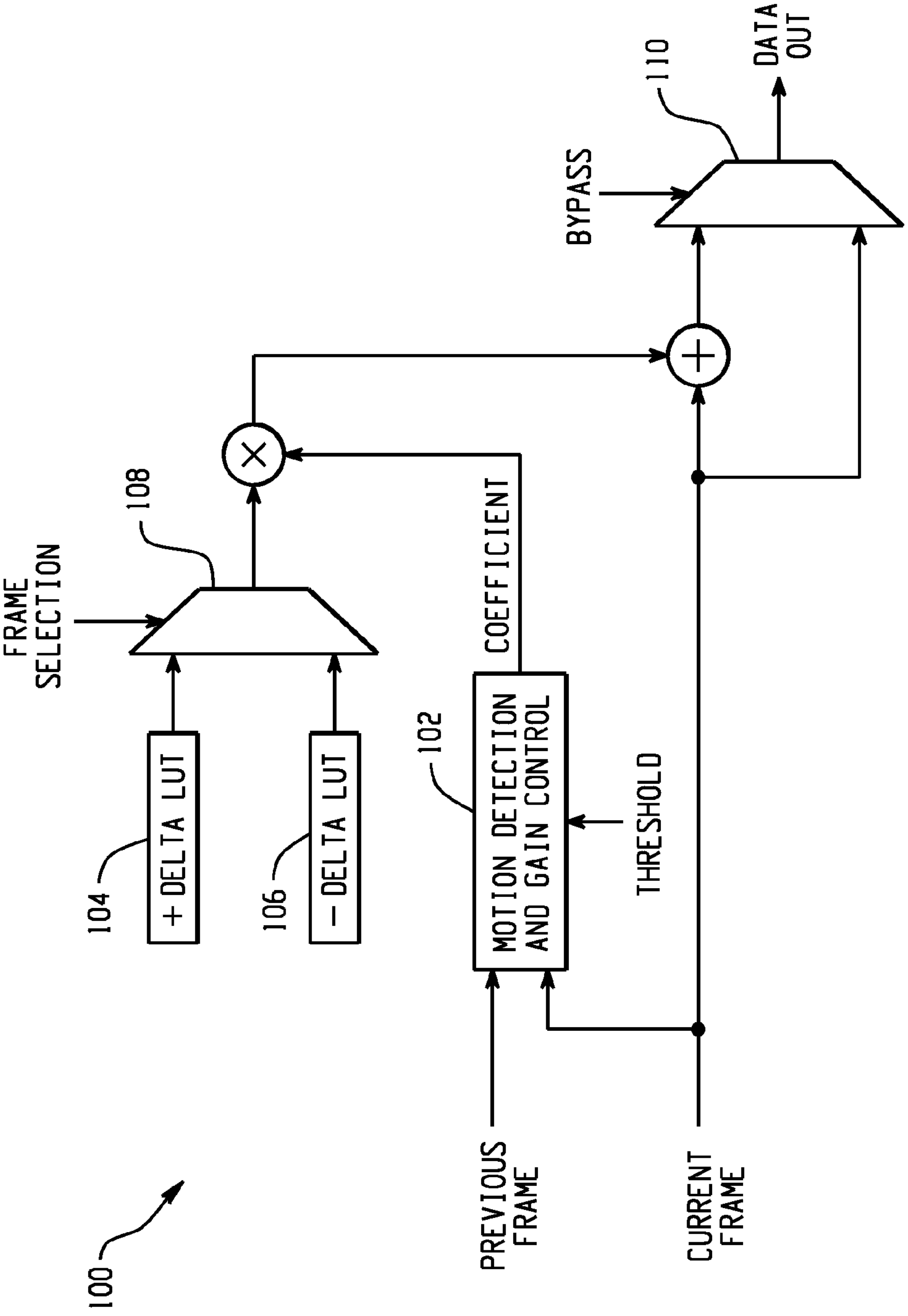
FIG. 7 is a block diagram depicting another example motion-adaptive AGD system.

FIG. 7 is a block diagram depicting another example motion-adaptive AGD system 100. In this example, the re-sampled (frame-doubled) input is received by a motion detection and gain control block 102. The motion detection and gain control block 102 includes motion detection logic that compares adjacent frames of the video input to determine how many pixels are changed. This value is then compared with a threshold value to identify motion in the image. The threshold value may be selected such that the motion detection logic will ignore small data changes that are not indicative of motion. The motion detection and gain control block 102 generates a gain control coefficient based on whether or not motion is detected in the video input, as described above.

The gain control coefficient is applied to a luminance correction value from either a bright or dark look-up table 104, 106. The look-up tables 104, 106 are selected using a frame selection circuit 108 that is controlled by a frame selection signal such that the gain-adjusted bright ($\Delta^{+}$) and dark ($\Delta^{-}$) luminance correction values are applied to alternating frames of the re-sampled data stream to generate a gamma-adjusted output. In addition, this example further includes a bypass circuit 110 that may be used to select either the gamma-corrected output or the unadjusted input as the video output (Data Out).

Figure 8:
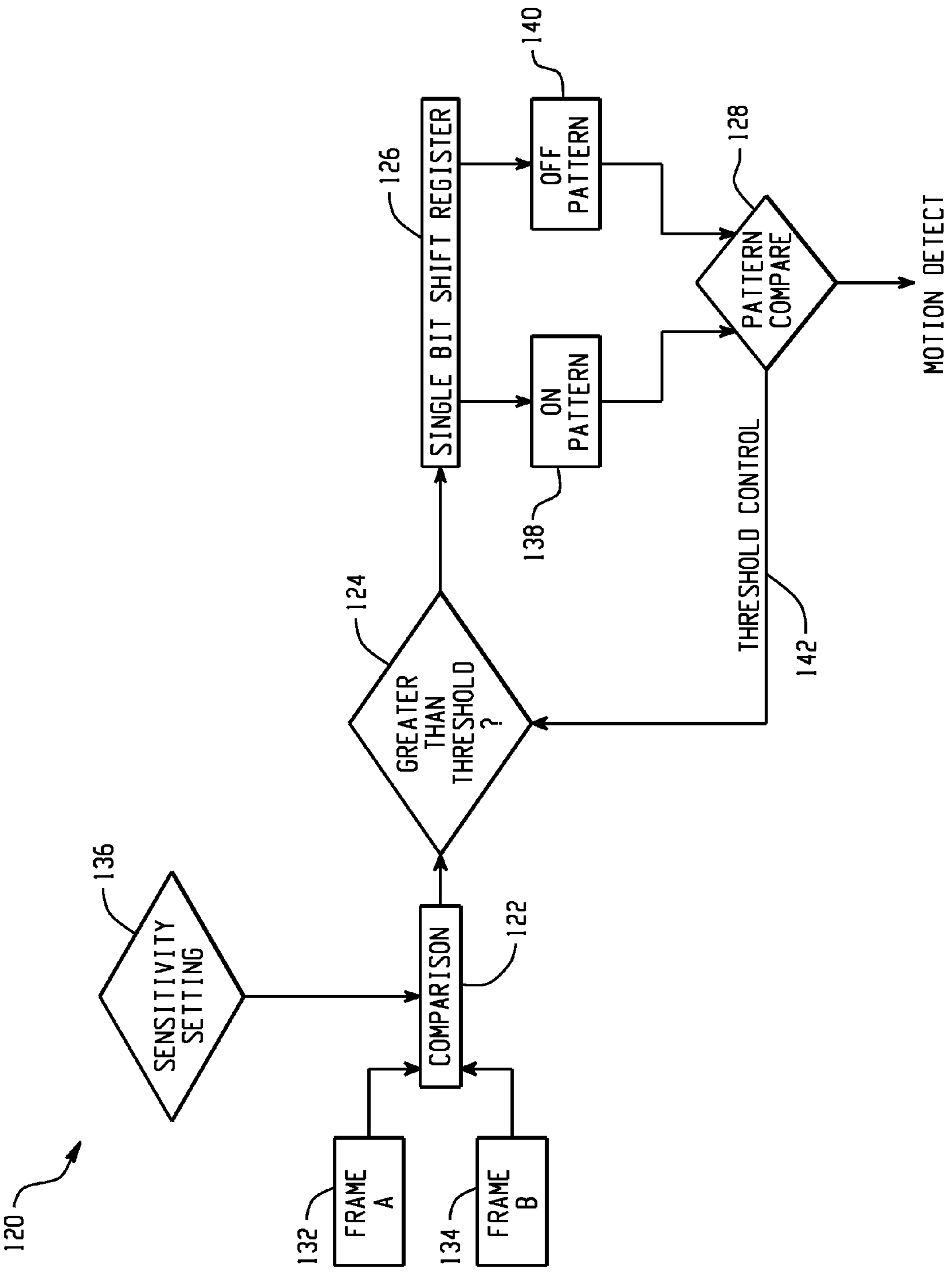
FIG. 8 is a block diagram depicting an example system for detecting motion in a video signal.

FIG. 8 is a block diagram depicting an example system 120 for detecting motion in a video signal. The motion detection system 120 includes a frame comparison block 122, a motion threshold comparison block 124, an open-ended single bit shift register 126 and a pattern comparison block 128. The motion-detection system 120 may, for example, be used to detect motion in the motion-adaptive AGD systems described herein with reference to FIGS. 6, 7 and 10.

In operation, the motion detection system 120 compares adjacent frames 132, 134 in a video signal to detect changes in the image that are indicative of motion. Specifically, the frame comparison block 122 compares each pixel in the adjacent frames 132, 134 to determine the total number of pixels that have changed. In determining whether a pixel has changed from one frame to the next, the frame comparison block 122 may utilize a pre-determined sensitivity setting 136 that provides a threshold value for identifying a change in an individual pixel value. The sensitivity setting 136 may be selected such that the frame comparison block 122 ignores slight pixel variations that may exist in a static image due to quantization error or noise between frames. For instance, in one example the sensitivity setting 136 may be set to ignore the 2 LSB of each color (R, G, B) in a video frame with 24 BPP color depth. It should be understood, however, that other sensitivity settings 136 may also be utilized to achieve a desired sensitivity.

The motion threshold comparison block 124 receives the total number of changed pixels from the frame comparison block 122 and compares this value with a programmable global motion threshold value. The motion threshold comparison block 124 generates a single bit output to the shift register 126 that indicates whether the total number of changed pixels is greater than the global motion threshold. For instance, the motion threshold comparison block 124 may output a "1" if the number of changed pixels is greater than the threshold and a "0" if it is not.

The open-ended shift register 126 and the pattern comparison block 128 identify motion in the video signal when the pixel changes between frames remain greater than the global motion threshold for a pre-determined number of consecutive frames. Specifically, the pattern comparison block 128 compares the values stored in the open-ended shift register 126 with pre-determined ON and OFF patterns 138, 140 to determine whether video images contain motion or are still. An example of ON and OFF patterns that may be utilized to detect motion are described below with reference to FIG. 9.

To further stabilize the motion detection system 120, a feedback signal 142 may also be provided from the pattern comparison block 128 to the threshold comparison block 124. The feedback signal 142 may be used to change the global motion detection threshold applied by the threshold comparison block 124 depending upon whether or not motion is detected. For instance, during periods when no motion is detected, a higher value global motion threshold may be used. The feedback signal 142 may then be used to lower the global motion threshold once motion has been detected. In this manner, once motion has initially been detected, less pixel change is needed to make a determination that the image remains in motion. In one example, the global motion threshold used in a static mode (i.e., no motion detected) may be four times greater than the global motion threshold used in motion mode (i.e., after motion is initially detected); however, other ratios could also be used.

Figure 9:
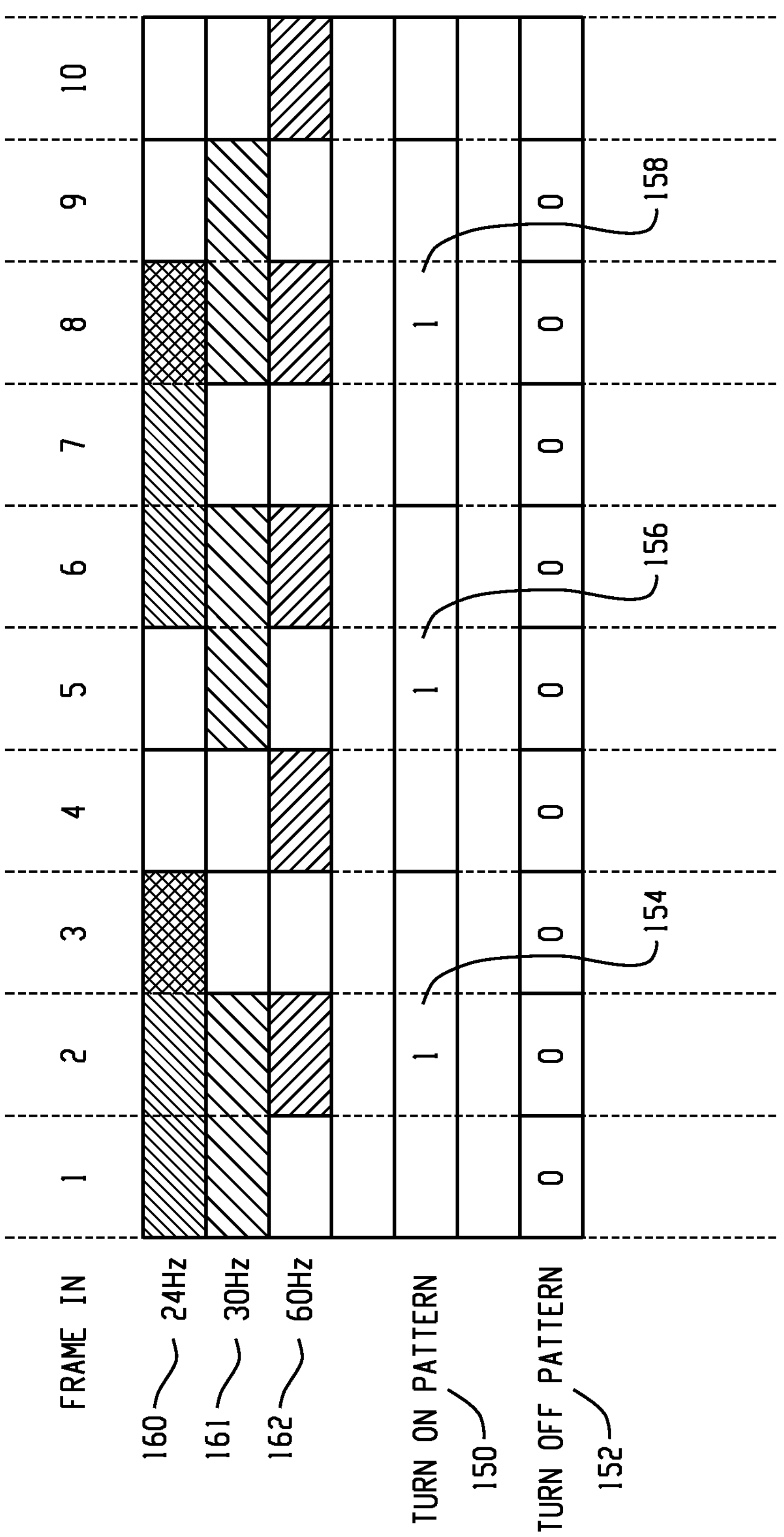
FIG. 9 depicts example motion detection patterns for the system of FIG. 8.

FIG. 9 depicts example ON and OFF motion detection patterns 150, 152 for the system of FIG. 8. The example ON pattern 150 identifies motion in the video signal if the shift register 126 includes a "1" in any bit position within three consecutive three-bit windows 154, 156, 158. That is, motion is identified if one or more logic level "1" is located in the shift register 126 at each of bit positions 1-3, 4-6 and 7-9. This example ON pattern 150 is used to account for the different bit patterns that will result during periods of motion depending upon the frame rates of the video source. Example bit patterns 160-162 indicative of motion are illustrated for frame rates of 24, 30 and 60 Hz, respectively. As illustrated, in each of these cases at least one logic level "1" will occur in each of the three windows 154, 156, 158 of the ON pattern 150.

The example OFF pattern 152 identifies that the video signal is not in motion upon detecting "0s" in nine consecutive bit positions of the shift register 126. The OFF pattern 152 may be more simplistic than the ON pattern 150 because there is no frame rate dependency when the image is still.

Figure 10:
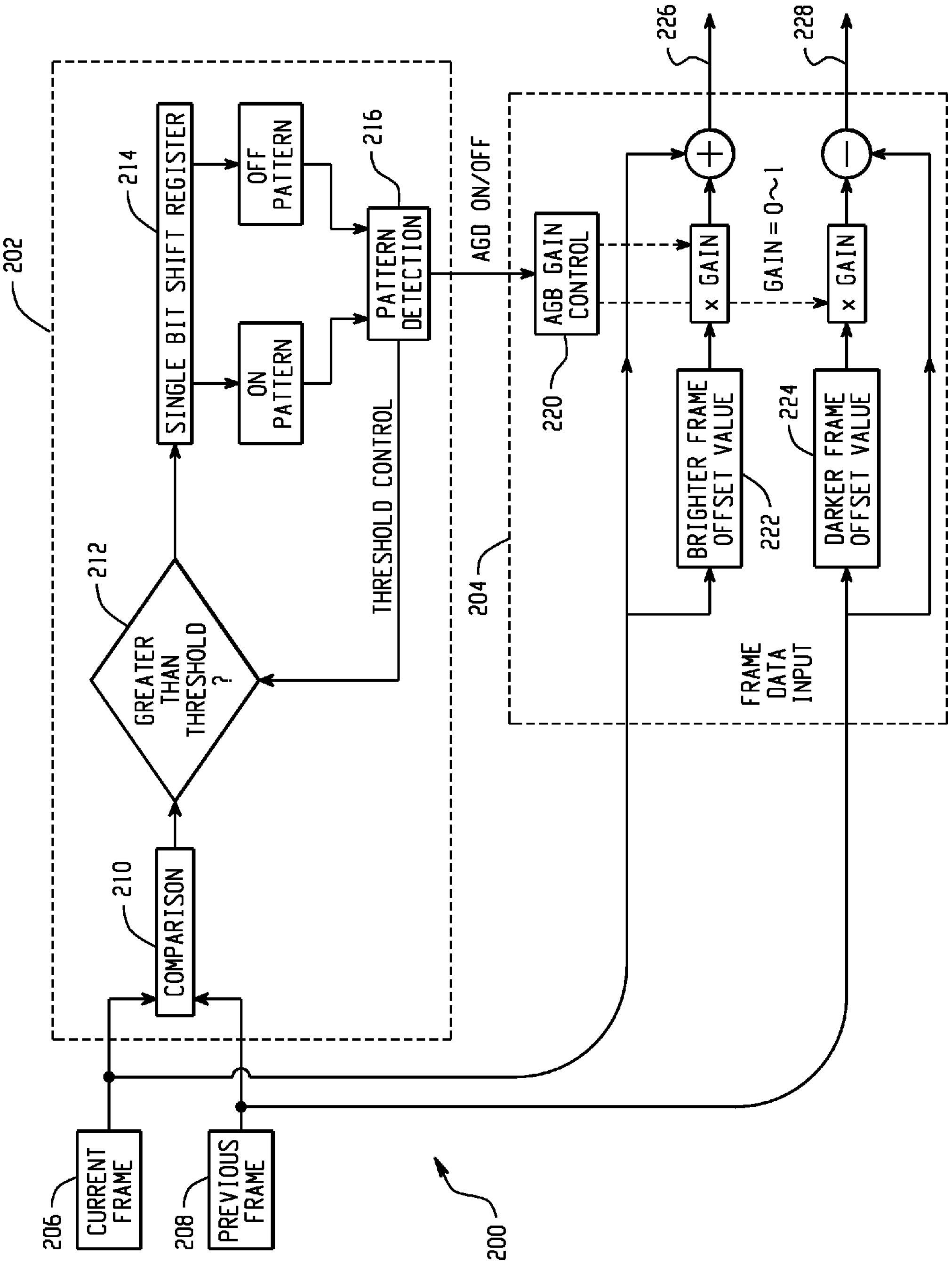
FIG. 10 is a block diagram depicting a further example of a motion-adaptive AGD system.

FIG. 10 is a block diagram depicting a further example of a motion-adaptive AGD system 200. The system 200 includes a motion detection circuit 202 and a luminance control circuit 204. In operation, a frame-doubled input 206, 208 is received by both the motion detection circuit 202 and the luminance control circuit 204. The motion detection circuit 202 identifies motion in the image by comparing the input frames 206, 208 and generates a motion detection output (AGD ON/OFF) that indicates whether motion has been detected in the video input or whether the video image is still. The luminance control circuit 204 applies gain-adjusted bright and dark luminance correction values to the frame-doubled input 206, 208 as a function of the motion detection output (AGD ON/OFF) such that AGD is applied to the frame-doubled input 206, 208 only when motion has been detected by the motion detection circuit 202.

The motion detection circuit 202 in this example is similar to the motion detection circuit described above with reference to FIGS. 8 and 9. Specifically, the motion detection circuit 202 includes a comparison block 210 that compares each pixel in the adjacent frames 206, 208 to determine the total number of pixels that have changed. This value is then compared with a global motion threshold value by a motion threshold comparison block 212 to generate a single bit output that is stored in an open-ended single bit shift register 214. The stored values in the shift register 214 are compared to ON and OFF motion detection patterns by a pattern detection block 216 to determine whether the video images contain motion or are still. When motion is detected based on the ON pattern, the pattern detection block 216 generates an AGD ON output signal and also generates a threshold control signal to reduce the global motion threshold applied by the threshold detection block 212. Similarly, when the images are determined to be still based on the OFF pattern, the pattern detection block 216 generates an AGD OFF output signal and also generates a threshold control signal to increase the global motion threshold.

The luminance control circuit 204 includes an AGD gain control block 220 that generates a gain control coefficient based on the AGD ON/OFF output signal from the motion control circuit 202. The gain control coefficient may, for example, be generated as described above with reference to FIGS. 4-5B. The gain control coefficient is applied to luminance correction values ($\Delta^+$ and $\Delta^-$) that are respectively derived from bright and dark look-up tables 222, 224. The gain-corrected look-up table values are then added to the input frames 206, 208 to generate odd and even gamma-adjusted outputs 226, 228.

Figure 11A:
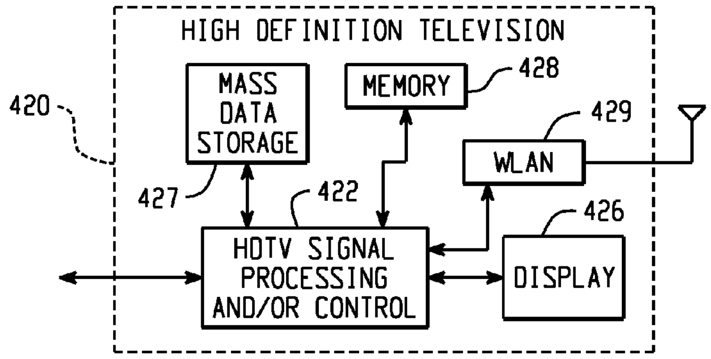
FIGS. 11A-11E depict examples of various systems in which a motion-adaptive AGD system may be utilized.

Referring now to FIGS. 11A-11E, various exemplary implementations of the present invention are shown. Referring to FIG. 11A, the present invention may be embodied in a high definition television (HDTV) 420. The present invention may implement either or both signal processing and/or control circuits, which are generally identified in FIG. 11A at 422, a WLAN interface and/or mass data storage of the HDTV 420. HDTV 420 receives HDTV input signals in either a wired or wireless format and generates HDTV output signals for a display 426. In some implementations, signal processing circuit and/or control circuit 422 and/or other circuits (not shown) of HDTV 420 may process data, perform coding and/or encryption, perform calculations, format data and/or perform any other type of HDTV processing that may be required.

HDTV 420 may communicate with mass data storage 427 that stores data in a nonvolatile manner such as optical and/or magnetic storage devices. The HDD may be a mini HDD that includes one or more platters having a diameter that is smaller than approximately 1.8". HDTV 420 may be connected to memory 428 such as RAM, ROM, low latency nonvolatile memory such as flash memory and/or other suitable electronic data storage. HDTV 420 also may support connections with a WLAN via a WLAN network interface 429.

Figure 11B:
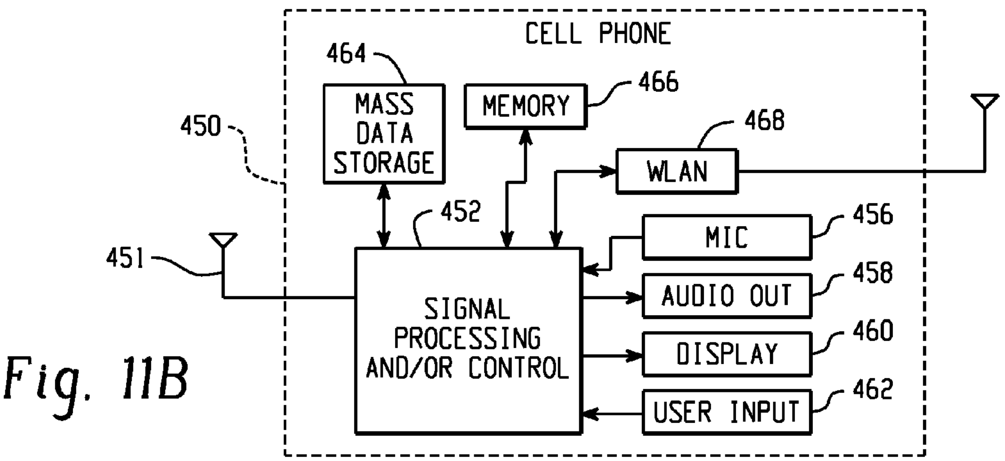

Referring now to FIG. 11B, the present invention may be embodied in a cellular phone 450 that may include a cellular antenna 451. The present invention may implement either or both signal processing and/or control circuits, which are generally identified in FIG. 11B at 452, a WLAN interface and/or mass data storage of the cellular phone 450. In some implementations, cellular phone 450 includes a microphone 456, an audio output 458 such as a speaker and/or audio output jack, a display 460 and/or an input device 462 such as a keypad, pointing device, voice actuation and/or other input device. Signal processing and/or control circuits 452 and/or other circuits (not shown) in cellular phone 450 may process data, perform coding and/or encryption, perform calculations, format data and/or perform other cellular phone functions.

Cellular phone 450 may communicate with mass data storage 464 that stores data in a nonvolatile manner such as optical and/or magnetic storage devices for example hard disk drives HDD and/or DVDs. The HDD may be a mini HDD that includes one or more platters having a diameter that is smaller than approximately 1.8". Cellular phone 450 may be connected to memory 466 such as RAM, ROM, low latency nonvolatile memory such as flash memory and/or other suitable electronic data storage. Cellular phone 450 also may support connections with a WLAN via a WLAN network interface 468.

Figure 11C:
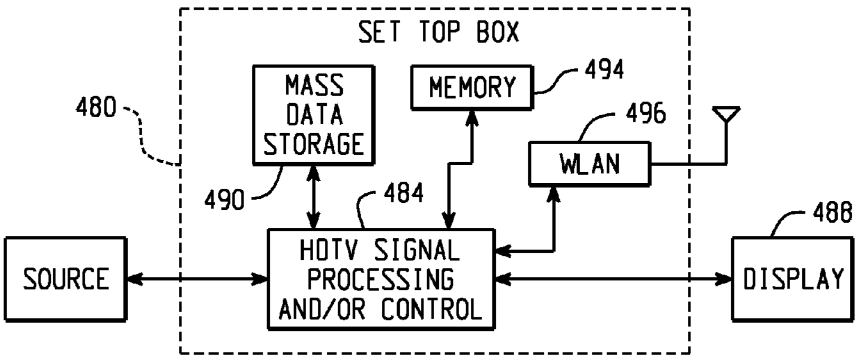

Referring now to FIG. 11C, the present invention may be embodied in a set top box 480. The present invention may implement either or both signal processing and/or control circuits, which are generally identified in FIG. 11C at 484, a WLAN interface and/or mass data storage of the set top box 480. Set top box 480 receives signals from a source such as a broadband source and outputs standard and/or high definition audio/video signals suitable for a display 488 such as a television and/or monitor and/or other video and/or audio output devices. Signal processing and/or control circuits 484 and/or other circuits (not shown) of the set top box 480 may process data, perform coding and/or encryption, perform calculations, format data and/or perform any other set top box functions.

Set top box 480 may communicate with mass data storage 490 that stores data in a nonvolatile manner. Mass data storage 490 may include optical and/or magnetic storage devices for example hard disk drives HDD and/or DVDs. The HDD may be a mini HDD that includes one or more platters having a diameter that is smaller than approximately 1.8". Set top box 480 may be connected to memory 494 such as RAM, ROM, low latency nonvolatile memory such as flash memory and/or other suitable electronic data storage. Set top box 480 also may support connections with a WLAN via a WLAN network interface 496.

Figure 11D:
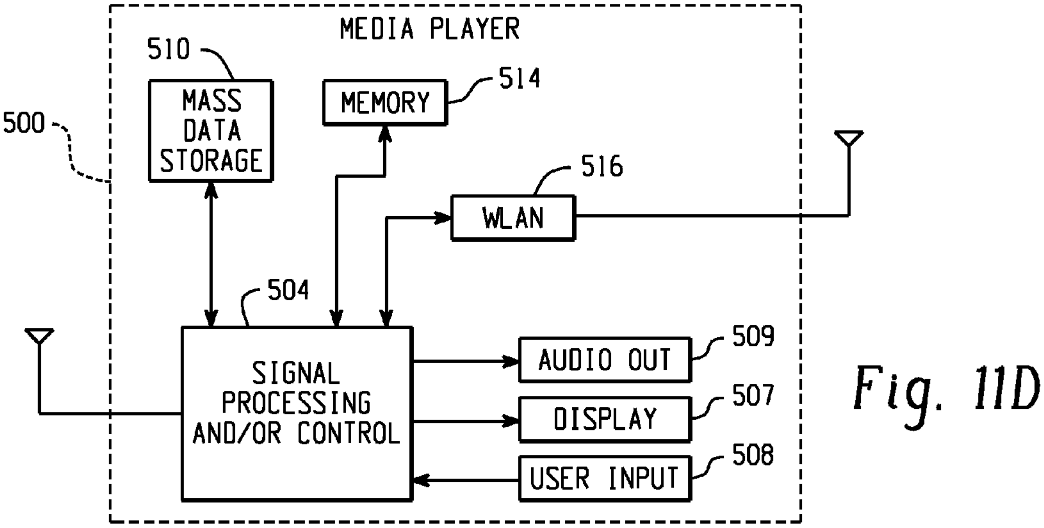

Referring now to FIG. 11D, the present invention may be embodied in a media player 500. The present invention may implement either or both signal processing and/or control circuits, which are generally identified in FIG. 11D at 504, a WLAN interface and/or mass data storage of the media player 500. In some implementations, media player 500 includes a display 507 and/or a user input 508 such as a keypad, touchpad and the like. In some implementations, media player 500 may employ a graphical user interface (GUI) that typically employs menus, drop down menus, icons and/or a point-and-click interface via display 507 and/or user input 508. Media player 500 further includes an audio output 509 such as a speaker and/or audio output jack. Signal processing and/or control circuits 504 and/or other circuits (not shown) of media player 500 may process data, perform coding and/or encryption, perform calculations, format data and/or perform any other media player function.

Media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". Media player 500 may be connected to memory 514 such as RAM, ROM, low latency nonvolatile memory such as flash memory and/or other suitable electronic data storage. Media player 500 also may support connections with a WLAN via a WLAN network interface 516. Still other implementations in addition to those described above are contemplated.

Figure 11E:
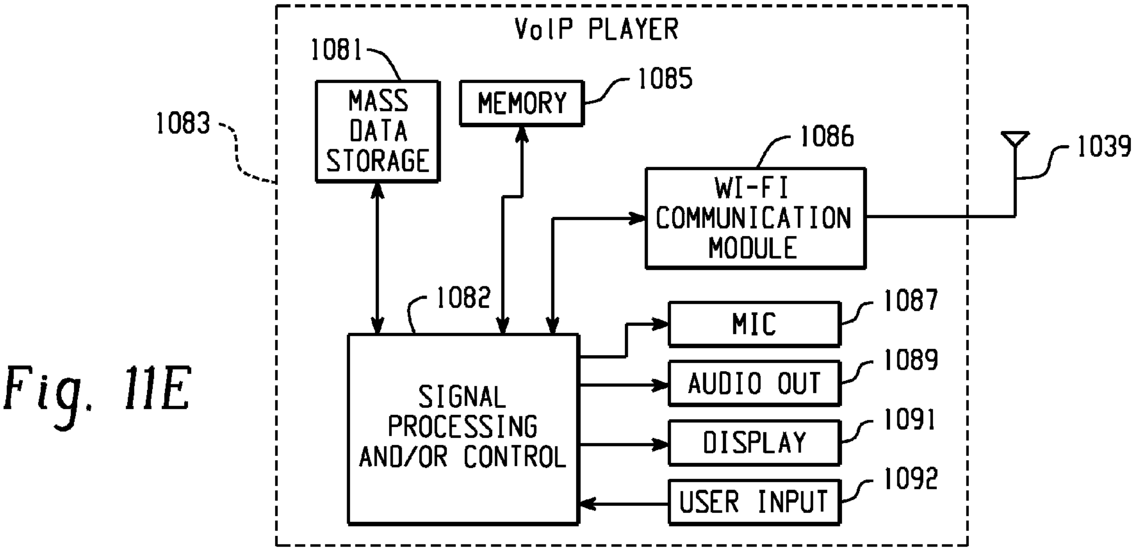

Referring to FIG. 11E, the present invention may be embodied in a Voice over Internet Protocol (VoIP) phone 550 that may include an antenna 518. The present invention may implement either or both signal processing and/or control circuits, which are generally identified in FIG. 11E at 504, a wireless interface and/or mass data storage of the VoIP phone 550. In some implementations, VoIP phone 550 includes, in part, a microphone 510, an audio output 512 such as a speaker and/or audio output jack, a display monitor 514, an input device 516 such as a keypad, pointing device, voice actuation and/or other input devices, and a Wireless Fidelity (Wi-Fi) communication module 508. Signal processing and/or control circuits 504 and/or other circuits (not shown) in VoIP phone 550 may process data, perform coding and/or encryption, perform calculations, format data and/or perform other VoIP phone functions.

VoIP phone 550 may communicate with mass data storage 502 that stores data in a nonvolatile manner such as optical and/or magnetic storage devices, for example hard disk drives HDD and/or DVDs. The HDD may be a mini HDD that includes one or more platters having a diameter that is smaller than approximately 1.8". VoIP phone 550 may be connected to memory 506, which may be a RAM, ROM, low latency nonvolatile memory such as flash memory and/or other suitable electronic data storage. VoIP phone 550 is configured to establish communications link with a VoIP network (not shown) via Wi-Fi communication module 508.

This written description uses examples to disclose the invention, including the best mode, and also to enable a person skilled in the art to make and use the invention. The patentable scope of the invention may include other examples that occur to those skilled in the art. For example, the motion detection system described above with reference to FIG. 8 could also be used for other motion detection applications. For instance, the motion detection system of FIG. 8 could instead be used to detect motion in a surveillance video and to control video tape recording when motion is detected in the video stream without the need for a motion sensor.

It is claimed:

1. A method for reducing motion blur in a video image displayed on a video display, the method comprising:

receiving a video signal that includes a plurality of frames associated with the video image to be displayed on the video display, each of the plurality of frames having a luminance level;

comparing the plurality of frames of the video signal to detect motion in the video image, wherein comparing the plurality of frames of the video signal to detect motion in the video image includes determining a number of pixel changes between consecutive frames in the video signal, and comparing the number of pixel changes with a global motion threshold value, wherein a number of pixel changes greater than the global motion threshold value is an indication of motion in the video image; and varying the luminance levels between two or more consecutive frames of the video image in order to reduce motion blur in the video image, wherein varying the luminance levels between two or more consecutive frames of the video image comprises gradually increasing over time a difference in the luminance levels between the two or more consecutive frames upon detecting motion in the video image, and gradually decreasing over time the difference in the luminance levels between the two or more consecutive frames upon detecting that the video image is not in motion, wherein the luminance levels of the two or more consecutive frames are determined based on luminance correction values, wherein the luminance correction values are computed by applying a gain coefficient that varies in a stepwise manner with time to one or more lookup table values, and wherein the luminance levels of the two or more consecutive frames are determined based on an equation $$D_{out,n}=D_{in,n}+(-1)^n\cdot C(m)\cdot\Delta(d),$$

where $D_{out,n}$ is an output luminance value for a frame n, $D_{in,n}$ is an input luminance value for the frame n, C(m) is the gain coefficient that varies in a stepwise manner with time, and Δ(d) is a luminance correction value from a lookup table that varies based on whether the frame n is an even-numbered frame or an odd-numbered frame.

2. The method of claim 1, further comprising:

comparing the plurality of frames of the video signal to detect when the video image is not in motion; and in response to detecting that the video image is not in motion, discontinuing the variance of the luminance levels of the video signal.

3. The method of claim 2, wherein the received video signal is doubled such that each frame of the received video signal is split into a first frame and a second frame at double frequency.

4. The method of claim 3, wherein the luminance levels are varied between the two or more consecutive frames by increasing the luminance level of the first frame and decreasing the luminance level of the second frame.

5. The method of claim 3, wherein the luminance levels are varied between the two or more consecutive frames by replacing each second frame with a black frame.

6. The method of claim 3, wherein the luminance levels are varied between the two or more consecutive frames by replacing each second frame with a grey frame.

7. The method of claim 3, further comprising:

using a bright look-up table to adjust the luminance level of the first frame; and using a dark look-up table to adjust the luminance level of the second frame, wherein the first frame is adjusted to a brighter luminance level than the second frame.

8. The method of claim 7, further comprising:

upon detecting motion in the video image, applying a gain coefficient to a luminance value from the bright look-up table that is used to adjust the luminance level of the first frame; and varying the gain coefficient to cause a gradual increase in an amount by which the luminance level of the first frame is adjusted.

9. The method of claim 7, further comprising:

upon detecting that the video image is not in motion, applying a gain coefficient to a luminance value from the dark look-up table that is used to adjust the luminance level of the second frame; and varying the gain coefficient to cause a gradual decrease in an amount by which the luminance level of the second frame is adjusted.

10. The method of claim 1, further comprising:

generating a binary output that indicates whether or not the number of pixel changes is greater than the global motion threshold value;

storing the binary output for a plurality of consecutive frames of the video signal;

comparing the stored binary output for the plurality of consecutive frames with a first bit pattern that is indicative of motion in the video image, wherein motion is detected in the video image if the stored binary output for the plurality of consecutive frames matches the first bit pattern; and comparing the stored binary output for the plurality of consecutive frames with a second bit pattern that is indicative of stillness in the video image, wherein a detection that the video image is not in motion is made if the stored binary output for the plurality of consecutive frames matches the second bit pattern.

11. The method of claim 10, wherein the first bit pattern includes a plurality of multiple bit windows, and a match between the stored binary output and the first bit pattern is identified if the stored binary output includes at least one bit indicative of motion in each of the plurality of multiple bit windows.

12. A system for reducing motion blur in a video image displayed on a video display, the system comprising:

a motion detection circuit configured to compare a plurality of frames in a video signal to generate a motion detection output signal that indicates whether the video signal includes an image that is in motion or a still image, wherein the motion detection circuit includes:

a frame comparison block configured to determine a number of pixel changes between consecutive frames in the video signal, and a motion threshold comparison block configured to compare the number of pixel changes with a global notion threshold value, wherein a number of pixel changes greater than the global motion threshold value is an indication that the video signal includes an image that is in motion; and a luminance control circuit configured to vary luminance levels between two or more consecutive frames of the video signal, wherein an amount by which the luminance levels are varied between the two or more consecutive frames is gradually increased over time when the motion detection output signal indicates that the video signal includes the image that is in motion, wherein the amount by which the luminance levels are varied between the two or more consecutive frames is gradually decreased over time when the motion detection output signal indicates that the video signal includes the still image, wherein the luminance levels of the two or more consecutive frames are determined based on luminance correction values, wherein the luminance correction values are computed by applying a gain coefficient that varies in a stepwise manner with time to one or more lookup table values, and wherein the luminance levels of the two or more consecutive frames are determined based on an equation $$D_{out,n}=D_{in,n}+(-1)^n\cdot C(m)\cdot\Delta(d),$$

where $D_{out,n}$ is an output luminance value for a frame n, $D_{in,n}$ is an input luminance value for the frame n, C(m) is the gain coefficient that varies in a stepwise manner with time, and Δ(d) is a luminance correction value from a lookup table that varies based on whether the frame n is an even-numbered frame or an odd-numbered frame.

13. The system of claim 12, further comprising:

a frame-doubling data sampler configured to double the frames of the video signal such that each frame of the video signal is split into a first frame and a second frame.

14. The system of claim 13, wherein the luminance levels are varied between the two or more consecutive frames by increasing the luminance level of the first frame and decreasing the luminance level of the second frame.

15. The system of claim 13, wherein the luminance levels are varied between the two or more consecutive frames by replacing each second frame with a black frame.

16. The system of claim 13, wherein the luminance levels are varied between the two or more consecutive frames by replacing each second frame with a grey frame.

17. The system of claim 13, further comprising:

a bright look-up table that includes a first set of luminance correction values; and a dark look-up table that includes a second set of luminance correction values;

wherein the luminance control circuit is configured to vary the luminance levels between the two or more consecutive frames by using the bright look-up table to adjust the luminance level of the first frame and using the dark look-up table to adjust the luminance level of the second frame such that the first frame is adjusted to a brighter luminance level than the second frame.

18. The system of claim 17, wherein the first and second sets of luminance correction values provide an average luminance that corresponds to an original luminance of the video signal.

19. The system of claim 17, wherein the luminance control circuit comprises:

a gain control block configured to apply a gain coefficient to luminance values from the first and second sets of luminance values to adjust the luminance levels of the first and second frames;

the gain control block further configured to vary the gain coefficient to cause the gradual increase or gradual decrease in the amount by which the luminance levels are varied between the two or more consecutive frames.

20. The system of claim 12, wherein the motion threshold comparison block is further configured to generate a binary output that indicates whether or not the number of pixel changes is greater than the global motion threshold, and wherein the motion detection circuit further comprises:

shift register that stores the binary output for a plurality of consecutive frames of the video signal; and a pattern comparison block configured to compare the stored binary output with a first bit pattern that is indicative of motion and generate the motion detection output signal to indicate that the video signal includes an image that is in motion when the stored binary output matches the first bit pattern;

the pattern comparison block further configured to compare the stored binary output with a second bit pattern that is indicative of stillness and generate the motion detection output to indicate that the video includes a still image when the stored binary output matches the second bit pattern.

21. The system of claim 20, wherein the first bit pattern includes a plurality of multiple bit windows, and wherein the pattern comparison block is configured to identify a match between the stored binary output and the first bit pattern if the stored binary output includes at least one bit indicative of motion in each of the plurality of multiple bit windows.

22. The system of claim 12, wherein the frame comparison block is further configured to apply a sensitivity setting to identify pixel changes between consecutive frames such that pixel variations below the sensitivity setting are ignored.

23. A method for detecting motion in a video signal, comprising:

receiving a video signal that includes a plurality of frames for displaying a video image, each of the plurality of frames having a luminance level;

determining a number of pixel changes between consecutive frames in the video signal;

comparing the number of pixel changes with a global motion threshold value, wherein a number of pixel changes greater than the global motion threshold value is an indication of motion in the video image; and varying the luminance levels between two or more consecutive frames of the video image, said varying comprising:

gradually increasing over time a luminance level difference between the two or more consecutive frames upon detecting motion in the video image, and gradually decreasing over time the luminance level difference between the two or more consecutive frames upon detecting that the video image is not in motion, wherein the luminance levels of the two or more consecutive frames are determined based on luminance correction values, wherein the luminance correction values are computed by applying a gain coefficient that varies in a stepwise manner with time to one or more lookup table values, and wherein the luminance levels of the two or more consecutive frames are determined based on an equation $$D_{out,n}=D_{in,n}+(-1)^n \cdot C(m) \cdot \Delta(d),$$

where $D_{out,n}$ is an output luminance value for a frame n, $D_{in,n}$ is an input luminance value for the frame n, C(m) is the gain coefficient that varies in a stepwise manner with time, and Δ(d) is a luminance correction value from a lookup table that varies based on whether the frame n is an even-numbered frame or an odd-numbered frame.

24. The method of claim 23, further comprising:

generating a binary output that indicates whether or not the number of pixel changes is greater than the global motion threshold value;

storing the binary output for a plurality of consecutive frames of the video signal; and comparing the stored binary output with predetermined bit patterns to determine if the video image is in motion or still.

25. The method of claim 24, further comprising:

comparing the stored binary output for the plurality of consecutive frames with a first bit pattern that is indicative of motion in the video image, wherein motion is detected if the stored binary output for the plurality of consecutive frames matches the first bit pattern; and comparing the stored binary output for the plurality of consecutive frames with a second bit pattern that is indicative of stillness in the video image, wherein a detection that the video image is not in motion is made if the stored binary output for the plurality of consecutive frames matches the second bit pattern.

26. The method of claim 24, wherein the first bit pattern includes a plurality of multiple bit windows, and a match between the stored binary output and the first bit pattern is identified if the stored binary output includes at least one bit indicative of motion in each of the plurality of multiple bit windows.

27. A system for detecting motion in a video signal, comprising:

a frame comparison block configured to determine a number of pixel changes between consecutive frames in the video signal, each of the frames having a luminance level;

a motion threshold comparison block configured to compare the number of pixel changes with a global motion threshold value, wherein a number of pixel changes greater than the global motion threshold value is an indication that the video signal includes an image that is in motion; and a luminance control circuit configured to vary luminance levels between two or more consecutive frames of the video signal, wherein an amount by which the luminance levels are varied between the two or more consecutive frames is gradually increased over time when the video signal includes the image that is in motion, wherein the amount by which the luminance levels are varied between the two or more consecutive frames is gradually decreased over time when the video signal does not include the image that is in motion, and wherein the luminance levels of the two or more consecutive frames are determined based on luminance correction values, wherein the luminance correction values are computed by applying a gain coefficient that varies in a stepwise manner with time to one or more lookup table values, and wherein the luminance level of the two or more consecutive frames are determined based on an equation $$D_{out,n}=D_{in,n}+(-1)^n\cdot C(m)\cdot\Delta(d),$$

where $D_{out,n}$ is an output luminance value for a frame n, $D_{in,n}$ is an input luminance value for the frame n, C(m) is the gain coefficient that varies in a stepwise manner with time, and Δ(d) is a luminance correction value from a lookup table that varies based on whether the frame n is an even-numbered frame or an odd-numbered frame.

28. The system of claim 27, wherein the motion threshold comparison block is further configured to generate a binary output that indicates whether or not the number of pixel changes is greater than the global motion threshold.

29. The system of claim 28, further comprising:

a shift register that stores the binary output for a plurality of consecutive frames of the video signal.

30. The system of claim 29, further comprising:

a pattern comparison block configured to compare the stored binary output with a first bit pattern that is indicative of motion, the pattern comparison block generating a motion detection output signal to indicate that the video signal includes an image that is in motion when the stored binary output matches the first bit pattern;

the pattern comparison block being further configured to compare the stored binary output with a second bit pattern that is indicative of stillness, the pattern comparison block generating a motion detection output to indicate that the video includes a still image when the stored binary output matches the second bit pattern.

31. The system of claim 30, wherein the first bit pattern includes a plurality of multiple bit windows, and wherein the pattern comparison block is configured to identify a match between the stored binary output and the first bit pattern if the stored binary output includes at least one bit indicative of motion in each of the plurality of multiple bit windows.

32. The system of claim 27, wherein the frame comparison block is further configured to apply a sensitivity setting to identify pixel changes between consecutive frames such that pixel variations below the sensitivity setting are ignored.

33. The system of claim 30, wherein the system is used to apply an alternating gamma driving (AGO) luminance correction technique to reduce motion blur when the motion detection output indicates that the video signal includes an image that is in motion and to disable the AGO luminance correction technique when the motion detection output indicates that the video signal includes a still image.

34. The system of claim 30, wherein the system is used to activate recording of a surveillance video when the motion detection output indicates that the video signal includes an image that is in motion and to stop recording of the surveillance video when the motion detection output indicates that the video signal includes a still image.

35. The method of claim 1, wherein the increase in the luminance level difference over time occurs during a first transition period, the first transition period being an amount of time required for the luminance level difference to reach a maximum luminance level difference or to begin decreasing; and wherein the decrease in the luminance level difference over time occurs during a second transition period, the second transition period being an amount of time required for the luminance level difference to reach a minimum luminance level difference or to begin increasing.

36. The system of claim 12, wherein the increase over time of the amount by which the luminance levels are varied occurs during a first transition period, the first transition period being a period of time required for the amount by which the luminance levels are varied to reach a maximum amount or to begin decreasing; and wherein the decrease over time of the amount by which the luminance levels are varied occurs during a second transition period, the second transition period being a period of time required for the amount by which the luminance levels are varied to reach a minimum value or to begin increasing.

37. The method of claim 23, wherein the increase in the luminance level difference over time occurs during a first transition period, the first transition period being an amount of time required for the luminance level difference to reach a maximum luminance level difference or to begin decreasing; and wherein the decrease in the luminance level difference over time occurs during a second transition period, the second transition period being an amount of time required for the luminance level difference to reach a minimum luminance level difference or to begin increasing.

38. The system of claim 27, wherein the increase over time of the amount by which the luminance levels are varied occurs during a first transition period, the first transition period being a period of time required for the amount by which the luminance levels are varied to reach a maximum amount or to begin decreasing; and wherein the decrease over time of the amount by which the luminance levels are varied occurs during a second transition period, the second transition period being a period of time required for the amount by which the luminance levels are varied to reach a minimum value or to begin increasing.

* * * * *